(12) United States Patent
Sasaki et al.

(10) Patent No.: US 7,735,596 B2
(45) Date of Patent: Jun. 15, 2010

(54) POWER STEERING APPARATUS

(75) Inventors: Mitsuo Sasaki, Kanagawa (JP); Toru Takahashi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 750 days.

(21) Appl. No.: 11/400,320

(22) Filed: Apr. 10, 2006

(65) Prior Publication Data

US 2006/0237256 A1    Oct. 26, 2006

(30) Foreign Application Priority Data

Apr. 11, 2005    (JP)    ............... 2005-113337

(51) Int. Cl.
*B62D 5/00*    (2006.01)
(52) U.S. Cl. ...................... 180/422; 180/417
(58) Field of Classification Search ................ 180/422, 180/446, 417; 60/476; 137/315.03
See application file for complete search history.

(56) References Cited

U.S. PATENT DOCUMENTS

| | | | |
|---|---|---|---|
| 4,002,220 A * | 1/1977 | Wible | 180/421 |
| 5,934,406 A * | 8/1999 | Dvorak et al. | 180/442 |
| 5,950,757 A * | 9/1999 | Saita et al. | 180/404 |
| 5,975,232 A * | 11/1999 | Komatsu et al. | 180/417 |
| 6,041,883 A * | 3/2000 | Yokota et al. | 180/422 |
| 6,568,499 B2 * | 5/2003 | Nakazawa et al. | 180/422 |
| 6,886,657 B2 * | 5/2005 | Yokota et al. | 180/422 |

FOREIGN PATENT DOCUMENTS

JP    2004-306721 A    11/2004

OTHER PUBLICATIONS

Engineering in Training Review Manual (Six Edition) by Michael R. Lindeburg, P.E.*

* cited by examiner

*Primary Examiner*—Tony H. Winner
(74) *Attorney, Agent, or Firm*—Foley & Lardner LLP

(57) ABSTRACT

A power steering apparatus includes a hydraulic power cylinder, and a reversible pump driven by a motor and connected by left and right fluid passages with left and right pressure chambers of the power cylinder. The first and second fluid passages are so arranged that pressure losses in the first and second passages are substantially equal to each other.

8 Claims, 15 Drawing Sheets

POWER STEERING APPARATUS

BACKGROUND OF THE INVENTION

The present invention relates to power steering apparatus.

A Japanese patent provisional publication No. 2004-306721 discloses a power steering system including a hydraulic power cylinder, a reversible pump and a motor for driving the pump selectively in forward or reverse direction to supply the hydraulic pressure selectively to left and right pressure chambers of the power cylinder.

SUMMARY OF THE INVENTION

In the power steering system of the above-mentioned type, the steering feeling is unnatural if the left and right assist steering torques are unequal. In general, it is difficult to symmetrically arrange the left and right pipes for connecting the left and right pressure chambers of the power cylinder with the reversible pump in a manner of bilateral symmetry.

It is an object of the present invention to provide a power steering apparatus to prevent deterioration of the steering feeling without deteriorating the freedom of layout.

According to one aspect of the present invention, a power steering apparatus comprises: a hydraulic power cylinder including first and second fluid pressure chambers to assist a steering mechanism; a reversible pump including first and second outlets to supply a hydraulic pressure to the power cylinder; a first fluid passage connecting the first outlet of the reversible pump with the first pressure chamber of the power cylinder; a second fluid passage connecting the second outlet of the reversible pump with the second pressure chamber of the power cylinder, a motor to drive the reversible pump in one of forward and reverse directions; a steering load sensing section to ascertain a steering load of the steering mechanism; and a motor controlling section to control the motor in accordance with the steering load. The first and second fluid passages are made substantially equal in pressure loss to each other.

According to another aspect of the invention, 26. A power steering apparatus comprises: a hydraulic power cylinder including first and second fluid pressure chambers to assist a steering mechanism; a reversible pump including first and second outlets to supply a hydraulic pressure to the power cylinder; a first fluid passage connecting the first outlet of the reversible pump with the first pressure chamber of the power cylinder; a second fluid passage connecting the second outlet of the reversible pump with the second pressure chamber of the power cylinder, a motor to drive the reversible pump in one of forward and reverse directions; a steering load sensing section to ascertain a steering load of the steering mechanism; and a motor controlling section to deliver a motor drive signal to control the motor in accordance with the steering load. The motor controlling section is configured to modify the motor drive signal to increase a pump discharge pressure discharged from the reversible pump into one of the first and second fluid passages which is greater in pressure loss than the other.

According to still another aspect of the present invention, a power steering apparatus comprises: a hydraulic power cylinder including first and second fluid pressure chambers to assist a steering mechanism; a reversible pump including first and second outlets to supply a hydraulic pressure to the power cylinder; a first fluid passage connecting the first outlet of the reversible pump with the first pressure chamber of the power cylinder; a second fluid passage connecting the second outlet of the reversible pump with the second pressure chamber of the power cylinder, a motor to drive the reversible pump in one of forward and reverse directions; a steering load sensing section to ascertain a steering load of the steering mechanism; and a motor controlling section to deliver a motor drive signal to control the motor in accordance with the steering load. The first and second fluid passages are so arranged that an oil temperature in the first fluid passage is substantially equal to an oil temperature in the second fluid passage.

According to still another aspect of the present invention, a power steering apparatus comprises: a hydraulic power cylinder including first and second fluid pressure chambers to assist a steering mechanism; a reversible pump including first and second outlets to supply a hydraulic pressure to the power cylinder; a first fluid passage connecting the first outlet of the reversible pump with the first pressure chamber of the power cylinder; a second fluid passage connecting the second outlet of the reversible pump with the second pressure chamber of the power cylinder, a motor to drive the reversible pump in one of forward and reverse directions; a steering load sensing section to ascertain a steering load of the steering mechanism; and a motor controlling section to deliver a motor drive signal to control the motor in accordance with the steering load. One of the first and second fluid passages is a hotter passage which is to be placed in surroundings tending to make an oil temperature in the hotter passage higher than an oil temperature in the other of the first and second fluid passages, and the pressure loss of the hotter passage is greater than the pressure loss of the other of the first and second fluid passages.

According to still another aspect of the present invention, a power steering apparatus comprises: a hydraulic power cylinder including first and second fluid pressure chambers to assist a steering mechanism; a reversible pump including first and second outlets to supply a hydraulic pressure to the power cylinder; a first fluid passage connecting the first outlet of the reversible pump with the first pressure chamber of the power cylinder; a second fluid passage connecting the second outlet of the reversible pump with the second pressure chamber of the power cylinder, a motor to drive the reversible pump in one of forward and reverse directions; a steering load sensing section to ascertain a steering load of the steering mechanism; and a motor controlling section to deliver a motor drive signal to control the motor in accordance with the steering load. One of the first and second fluid passages is arranged to vary a pressure loss in the passage in accordance with a temperature condition of the passage.

DETAILED DESCRIPTION OF THE INVENTION

Figure 1:
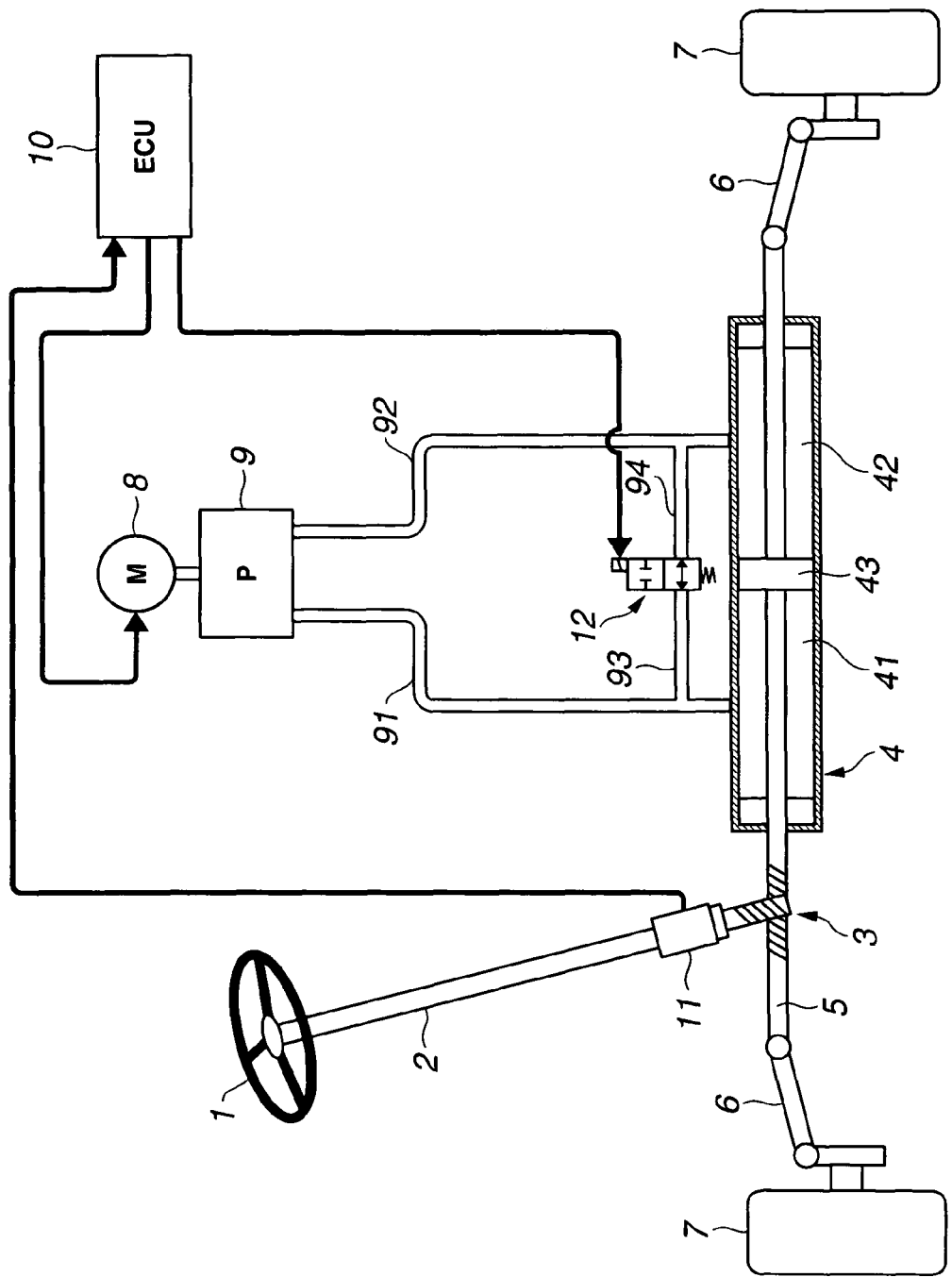
FIG. 1 is a schematic view showing power steering apparatus according to a first embodiment of the present invention.

FIG. 1 schematically shows part of a vehicle equipped with a power steering apparatus or system according to a first embodiment of the present invention. A steering mechanism includes a steering wheel 1 to be operated by a driver of the vehicle, and a steering shaft 2 connected with steering wheel 1. A steering torque sensor 11 is provided in a lower portion of steering shaft 2, and arranged to sense a driver's steering torque. Torque sensor 11 can serve as a main component of a steering load sensing section. A rack and pinion mechanism 3 is arranged to move a rack shaft 5 axially in accordance with a driver's steering operation quantity inputted by the driver to steering wheel 1.

Both ends of rack shaft 5 are connected, respectively, through tie rods 6 with steerable wheels 7 of the vehicle. When rack shaft 5 is moved axially, the steering mechanism steers the wheels 7 and thereby produces a desired steer angle in accordance with the amount of movement of rack shaft 5. A hydraulic power cylinder 4 is arranged to give assistance to an axial thrust force of rack shaft 5 and thereby to assist the driver's steering operation.

Power cylinder 4 includes a first pressure chamber 41, a second pressure chamber 42 and a piston 43 dividing the inside of a cylinder tube into the first and second pressure chambers 41 and 42, and moving rack shaft 5 hydraulically. A first fluid passage 91 is connected with first pressure chamber 41, and a second fluid passage 92 is connected with second pressure chamber 42.

A reversible pump 9 driven by a motor 8 includes first and second pump outlets which are connected, respectively, with first and second fluid passages 91 and 92. A normally-open type fail-safe valve 12 is connected between the first and second fluid passages 91 and 92 via first and second branch passages 93 and 94 which branch off, respectively, from first and second fluid passages 91 and 92, and which form a connection passage. In case of system failure, fail-safe valve 12 opens the connection passage composed of the first and second branch passages 93 and 94, and thereby connects the first and second pressure chambers 41 and 42 of power cylinder 4 through the connection passage.

A control unit 10 is connected with torque sensor 11 to receive a torque sensor signal, and configured to calculate a desired assist force in accordance with the torque sensor signal. Control unit 10 calculates a target motor current corresponding to this assist force, and produces a current command (motor drive signal) according to the PID control action based on a deviation of an actual motor current from the target. In the PID control system, the control quantity is set equal to a sum of a proportional term, an integral term and a derivative term. The proportional term is a component which increases as the deviation increases. The integral term is a component outputted in accordance with a sum of input values, and the derivative term is a component outputted in accordance with a time rate of change (responsiveness) of input.

At the time of a system start, the fail-safe valve 12 is put, by a command signal, in the state to shut off the connection between the first and second branch passages 93 and 94. In this normal state, if a steering torque is inputted to move rack shaft 5 rightward as viewed in FIG. 1, the control unit 10 controls motor 8 by producing the motor control signal in a direction (positive direction in this example) to suck the oil from second pressure chamber 42 and to supply the oil to first pressure chamber 41, and thereby produces a pressure difference between first and second pressure chambers 41 and 42 to provide assistance to the steering torque of the driver. If, on the other hand, a steering torque is inputted to move rack shaft 5 leftward, the control unit 10 controls motor 8 by producing the motor control signal in the opposite direction, and thereby produces assistance to the driver's steering torque in the same manner.

When control unit 10 judges that there is a failure in the system, the control unit 10 stops the drive signal to motor 8, and shuts off the current supply to fail-safe valve 12 to connect the first and second branch passages 93 and 94. If the driver turns the steering wheel 1 in this fail-safe state, the piston 43 moves in power cylinder 4, and the oil can flow freely between first and second pressure chambers 41 and 42 through the fail-safe valve 12, so that the driver can steer the vehicle in a manual steering mode with no power assist.

Figure 2:
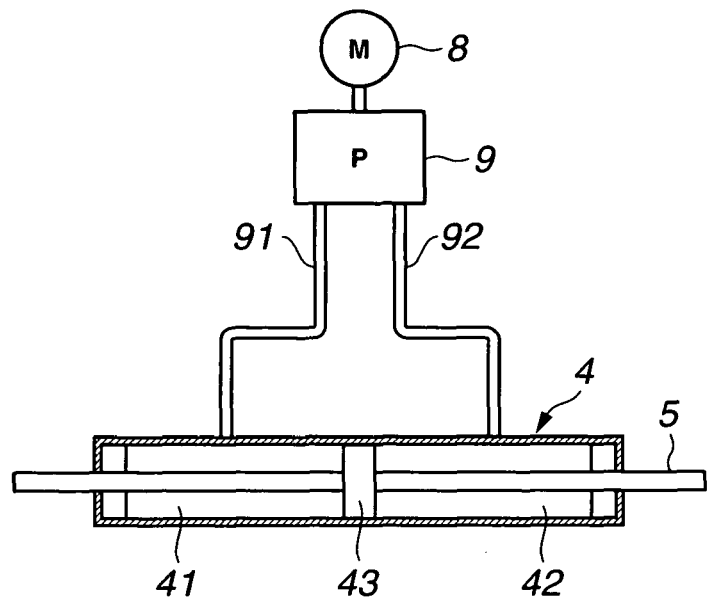
FIG. 2 is a schematic view showing a main part of the power steering apparatus of FIG. 1.

FIG. 2 schematically shows a main part of the power steering system of FIG. 1. The pressure loss of first fluid passage 91 and the pressure loss of second fluid passage 92 are set substantially equal to each other. In this example, the lengths of first and second fluid passages 91 and 92 are substantially equal to each other.

In general, the pressure loss in piping means a pressure drop produced at an outlet of a pipe because of influence of the viscosity of the operating oil, loss of kinetic momentum due to a bend in piping, etc., when the oil is supplied into an inlet of the pipe under a predetermined pressure at a predetermined flow rate. In general, the pressure drop (loss) is expressed by the following equations.

A pressure loss in a pipe $\Delta P1$ (kgf/cm$^2$):

$$\Delta P1 = 128 \times \{(v \times 0.01 \times \gamma/(980 \times 1000)) \times (L1/10)\}/(\pi \times (r/10)^4 \times Q)$$

A pressure loss in bent portions $\Delta P2$ (kgf/cm$^2$):

$$\Delta P2=\{(\xi b\times(Q/(r/10)^2\times\pi/4)^2\times(\gamma/1000))\}\times m1$$

A pressure loss in a cylinder plug portion $\Delta P3$ (kgf/cm$^2$):

$$\Delta P3=\{(\eta b\times(Q/(\phi/10)^2\times\pi/4)^2/(2\times980)\}\times(\gamma/1000)$$

A total pressure loss $\Delta P$:

$$\Delta P=\Delta P1+\Delta P2+\Delta P3$$

In these equations, $\nu$ is the kinetic viscosity of the oil (cSt(at 40° C.)); $\gamma$ is the density of the oil (g/cm3 (at 15° C.)); L1 is the length of the pipe (mm); r is the inside diameter of the pipe (mm); Q is the flow rate (cm$^3$/s); $\xi$b, $\eta$b are loss coefficients of the pipe and plug; m1 is the number of 90° bends (elbows); $\phi$ is the inside diameter of the plug (mm). The cylinder plug portion is a portion provided in a connecting portion between the pipe and cylinder.

Thus, it is possible to make the pressure losses of first and second fluid passages 91 and 92 substantially equal to each other by making $\Delta P$ of first fluid passage 91 and $\Delta P$ of second fluid passage 92 substantially equal to each other. In this example of the first embodiment, the first and second fluid passages 91 and 92 are substantially equal in pipe length. Moreover, the number of bends in first fluid passage 91 is equal to the number of bends in second fluid passage 92. (In this case, the bends serves as a correcting section to make the first and second fluid passages (91, 92) substantially equal in pressure loss to each other. In this example, the pressure loss is expressed by the following equation.

$$\Delta P=\lambda\times(l/d)\times(V^2/2g)+(m\times\xi)\times(V^2/2g)$$

In this equation, $\lambda$ is the friction coefficient of the pipe; l is the pipe length; d is the pipe inside diameter; V is the average fluid velocity (m/s); g is the gravitational acceleration (9.81 m/s$^2$); m is the number of the bends; $\xi$ is a bend friction coefficient.

Figure 3:
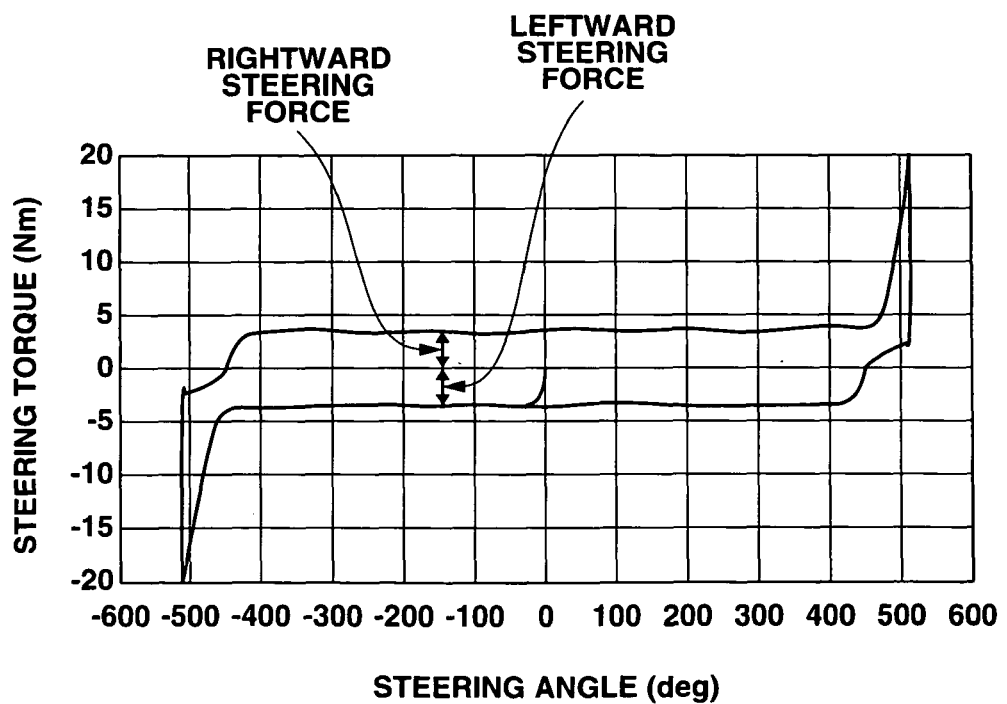
FIG. 3 is a graph showing a relationship between a steering angle and a steering torque for illustrating the first embodiment.

FIG. 3 shows a relationship between a steering angle and a steering torque. In general, the power steering system is tuned or adjusted to produce an assist torque so that the steering torque is within a range of 3~5 Nm. In this case, an average driver tends to feel an unnatural feeling when the difference between the steering force in the leftward steering operation and the steering force in the rightward steering operation is greater than 0.5 Nm. Therefore, in this example, the first and second fluid passages 91 and 92 are so designed that the difference between the pressure losses in the first and second fluid passages 91 and 92 is smaller than or equal to 0.5 Nm. Thus, this power steering system can provide stable power assistance without causing an unnatural steering feeling.

If the left and right steering torque difference is still greater than 0.5 Nm despite the equality in pipe length and in the number of bends between the first and second fluid passages 91 and 92, then it is optional to increase the number of bends in one of the first and second fluid passages 91 and 92 which receives a greater assist torque. (In this case, the bends serve as the correcting section.) In this way, it is possible to avoid an unnatural steering feeling by adjusting the number of bends in the first and second fluid passages 91 and 92.

The power steering system according to this embodiment employs the reversible pump 9 driven in the forward or reverse direction by motor 8. The power steering system of this type is different from a conventional power steering system employing a rotary valve in the following points. In the rotary valve type power steering system, the pump is always driven by an engine, and its oil pressure is always supplied to the rotary valve provided near a torsion bar. The torsion bar is disposed near the rack and pinion gear mechanism, and a desired assist torque is supplied to the power cylinder when the rotary valve varies the opening degree in accordance with the steering torque. Thus, the rotary valve is connected with the pressure source of the pump by a single fluid passage, so that the hydraulic pressure supplied from the pressure source does not differ so much between the leftward steering and rightward steering.

In the case of the power steering system of the first embodiment, by contrast, the pump is driven by the motor according to need, so that the pressure source can decrease the engine load. Furthermore, the hydraulic pressure is supplied from the single pressure source directly to the two different portions (that is, the first and second pressure chambers 41 and 42). When the choice of the positions for installing motor 8 and reversible pump 9 is limited, the two fluid passages tend to be long and tend to differentiate the steering feeling between the leftward and rightward steering operations. The arrangement according to the first embodiment can improve the left and right steering feelings. In the first embodiment, it is possible to employ an asymmetric arrangement in which the first and second fluid passages 91 and 92 are asymmetric with respect to an imaginary median plane bisecting the power cylinder into left and right equal halves.

Figure 4:
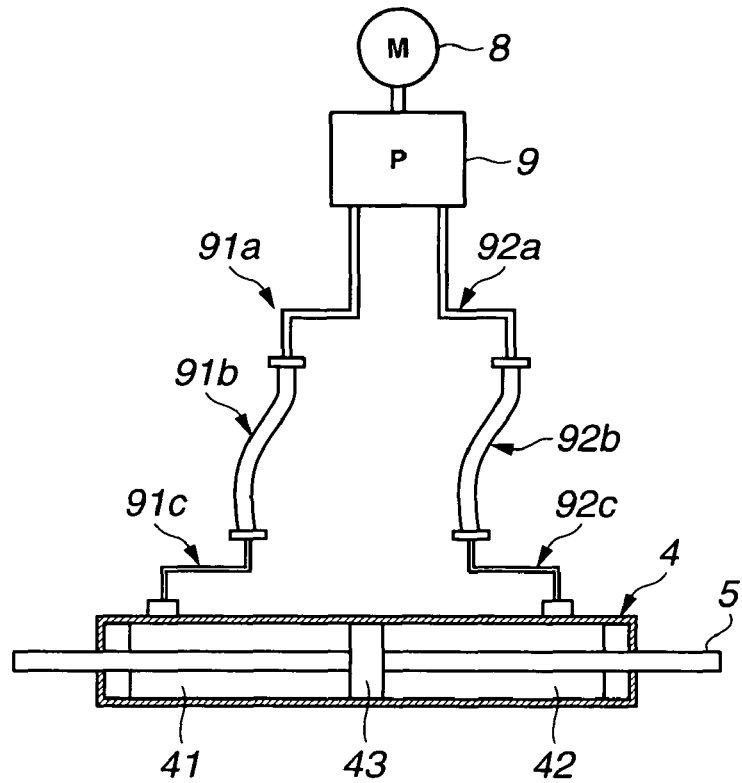
FIG. 4 is a schematic view showing a main part of power steering apparatus according to a second embodiment.

FIG. 4 shows a main part of a power steering system according to a second embodiment of the present invention. This system is basically the same as the power steering system of the first embodiment, and the following explanation is directed mainly to different points to avoid repetitive explanation. In the first embodiment, each of the first and second fluid passages 91 and 92 is a single uniform pipe or tube. In the case of the second embodiment, each of the first and second fluid passages 91 and 92 is composed of an upstream segment 91a or 92a made of a rigid pipe which, in this example, is a steel pipe and connected with reversible pump 9; an intermediate segment 91b or 92b made of a flexible tube which, in this example, is a rubber hose; and a downstream segment 91c or 92c made of a rigid pipe which is a steel pipe, and connected with the power cylinder 4.

The first and second fluid passages 91 and 92 are made identical in material so as to equalize the pressure loss between the first and second fluid passages 91 and 92 and improve the steering feeling. In this example, the materials of the three segments 91a, 91b and 91c of first fluid passage 91 are the same as the materials of the three segments 92a, 92b and 92c of second fluid passage 92, respectively.

Figure 5:
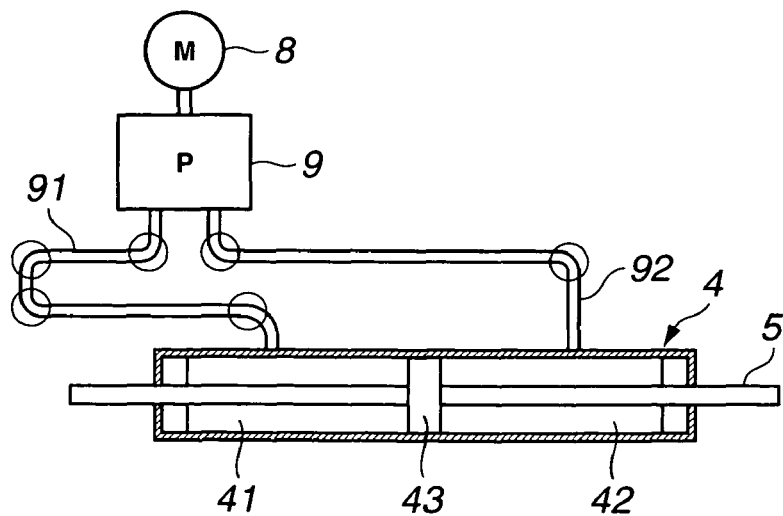
FIG. 5 is a schematic view showing a main part of power steering apparatus according to a third embodiment.

FIG. 5 shows a main part of a power steering system according to a third embodiment. This system is basically the same as the power steering system of the first embodiment, and the following explanation is directed mainly to different points to avoid repetitive explanation. In the third embodiment, the number of bent portions or bends is differentiated between the first and second fluid passages 91 and 92 to equalize the pressure loss. In the example of FIG. 5, the first fluid passage 91 is shorter than the second fluid passage 92, and the number of bends formed in first fluid passage 91 is greater than that of the second fluid passage 92. In this example, the shorter first fluid passage 91 includes four bends (90° elbows) whereas the longer second fluid passage 92 includes two bends (90° elbows). The number of bends is four in the shorter first fluid passage 91, and two in the case of the longer second fluid passage 92.

In the case of first fluid passage 91, the pressure loss due to the passage length is smaller, but the pressure loss due to the bends is greater. In the case of second fluid passage 92, on the other hand, the pressure loss due to the passage length is greater but the pressure loss due to the bends is smaller. Thus, it is possible to equalize the pressure loss between the first and second fluid passages 91 and 92 by adjusting the number of bends in at least one of the passages in dependence on the passage length. The number of bends is not limited to the numbers in the illustrated example.

Figure 6:
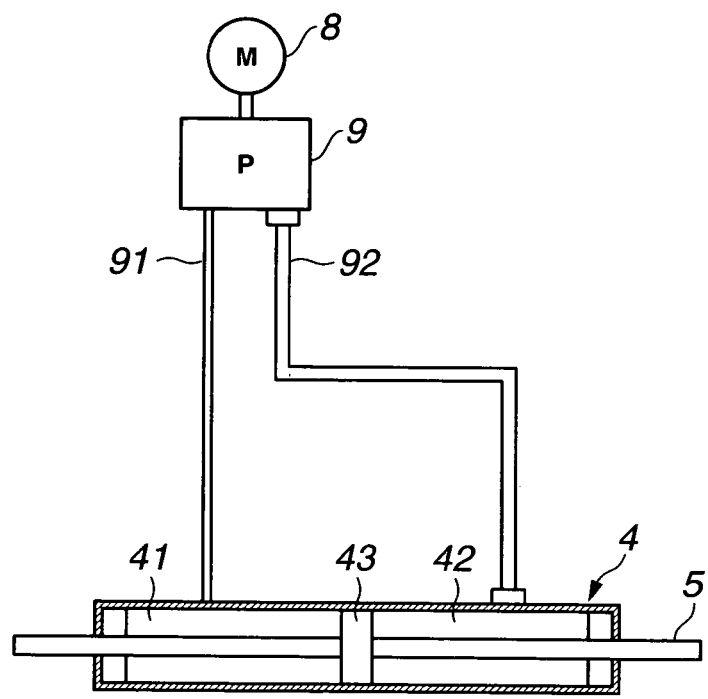
FIG. 6 is a schematic view showing a main part of power steering apparatus according to a fourth embodiment.

FIG. 6 shows a main part of a power steering system according to a fourth embodiment. This system is basically the same as the power steering system of the first embodiment, and the following explanation is directed mainly to different points to avoid repetitive explanation. In the example shown in FIG. 6, the first fluid passage 91 is thinner and shorter whereas the second fluid passage 92 is thicker and longer.

Thus, the inside cross sectional size or the inside diameter of the longer one (92 in the case of FIG. 6) between first and second fluid passages 91 and 92 is set greater than that of the shorter passage (91 in FIG. 6).

In the shorter first fluid passage 91, the pressure loss due to pipe length is smaller, but the pressure loss due to the smaller pipe cross sectional size is greater. In the longer second fluid passage 92, the pressure loss due to pipe length is greater but the pressure loss due to greater pipe sectional size is smaller. Thus, it is possible to equalize the pressure loss between first and second fluid passages 91 and 92 and to improve the steering feeling by adjusting the passage opening sizes and/or the passage lengths.

Figure 7:
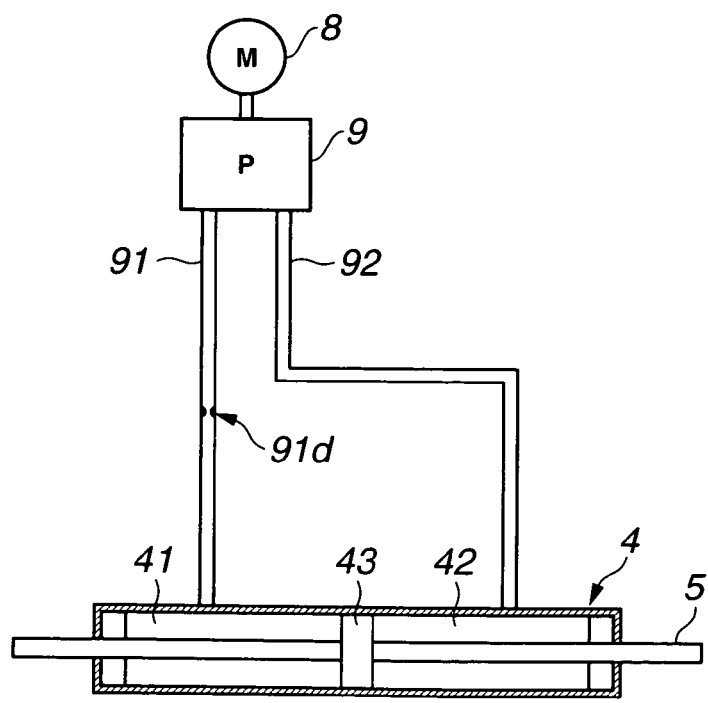
FIG. 7 is a schematic view showing a main part of power steering apparatus according to a fifth embodiment.

FIG. 7 shows a main part of a power steering system according to a fifth embodiment. This system is basically the same as the power steering system of the first embodiment, and the following explanation is directed mainly to different points to avoid repetitive explanation. In this embodiment, a flow restriction (or orifice) is provided in a shorter one of the first and second fluid passages 91 and 92. In the example of FIG. 7, the first fluid passage 91 is shorter than second fluid passage 92, and a flow restriction 91d (which can serve as a main component of the correcting section) is provided in the shorter first fluid passage 91.

In the shorter first fluid passage 91, the pressure loss due to the passage length is smaller but the pressure loss is increased by the flow restriction 91d. In the longer second fluid passage 92, the pressure loss due to the passage length is greater, but the second fluid passage 92 has no flow restriction. Thus, it is possible to equalize the pressure loss between first and second fluid passages 91 and 92 by employing at least one flow restriction.

Figure 8:
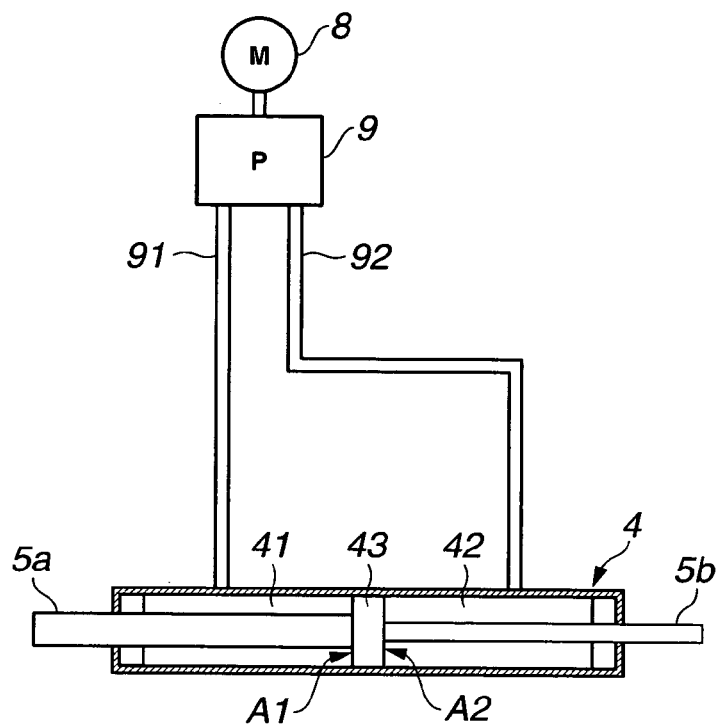
FIG. 8 is a schematic view showing a main part of power steering apparatus according to a sixth embodiment.

FIG. 8 shows a main part of a power steering system according to a sixth embodiment. This system is basically the same as the power steering system of the first embodiment, and the following explanation is directed mainly to different points to avoid repetitive explanation. The rod cross sectional size is differentiated between the first and second pressure chambers 41 and 42 of power cylinder 4 to improve the steering feeling. In the example shown in FIG. 8, the first fluid passage 91 is shorter and the second fluid passage 92 is longer, and a first rack shaft 5a extending in the first pressure chamber 41 is thicker than a second rack shaft 5b extending in the second pressure chamber 42 of power cylinder 4. In this example, the rod diameter of first rack shaft 5a is made greater, as compared to the standard diameter of second rack shaft 5b, and the pressure receiving area of piston 43 in the first pressure chamber 41 is decreased. The area A1 of piston 43 for receiving the fluid pressure in first pressure chamber 41 is made smaller than the area A2 of piston 43 for receiving the fluid pressure in second pressure chamber 42 (A1<A2).

Thus, the pressure receiving area of piston 43 in the pressure chamber connected with the fluid passage 91 or 92 smaller in pressure loss is decreased by increasing the rod diameter as compared to the pressure receiving area on the opposite side. In the shorter first fluid passage 91, the pressure loss due to the passage length is smaller, but the pressure receiving area A1 is decreased to decrease the thrust force of piston 42. In the longer second passage 92, on the other hand, the pressure loss due to the passage length is greater, but the pressure receiving area A2 is made greater than A1 to increase the thrust force produced in the second pressure chamber 42. In this way, it is possible to improve the steering feeling by adjusting the pressure receiving areas on the left and right sides of piston 43.

Figure 9:
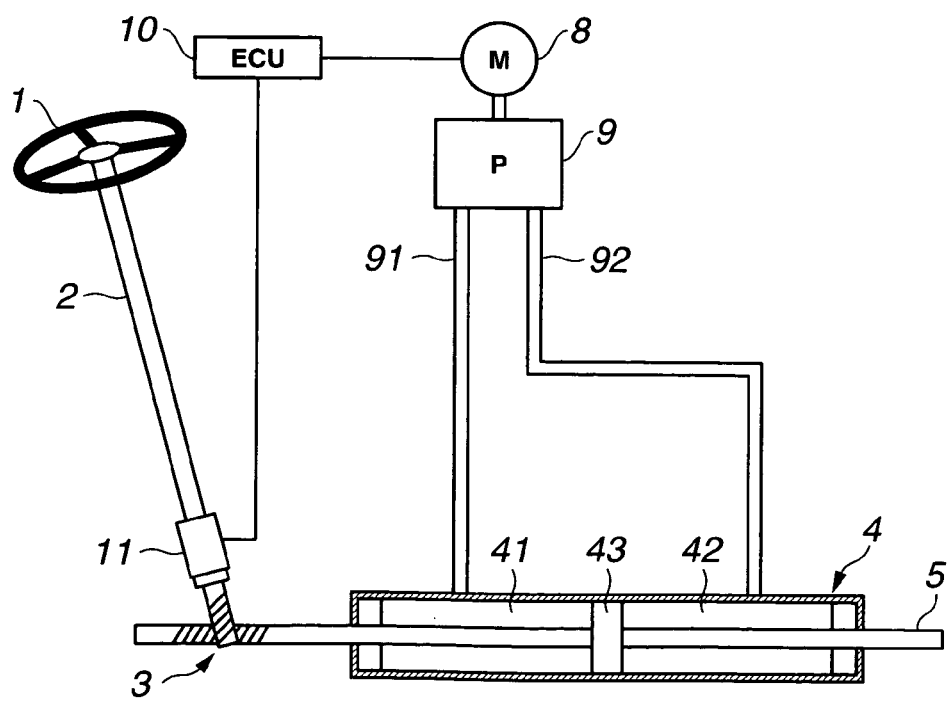
FIG. 9 is a schematic view showing a main part of power steering apparatus according to a seventh embodiment.

FIG. 9 shows a main part of a power steering system according to a seventh embodiment. This system is basically the same as the power steering system of the first embodiment, and the following explanation is directed mainly to different points to avoid repetitive explanation. In this embodiment, the control unit 10 modifies the motor drive signal to drive motor 8 so as to compensate for a difference in pressure loss between first and second fluid passages 91 and 92. In the example shown in FIG. 9, first fluid passage 91 is shorter than second fluid passage 92, and control unit 10 modifies the motor drive signal in accordance with the difference between the pressure losses of first and second fluid passages 91 and 92. In this embodiment, control unit 10 serves as a main component of the correcting section. The seventh embodiment employs the correction of control process by contrast to the first through sixth embodiments employing the correction in mechanical construction.

Figure 10:
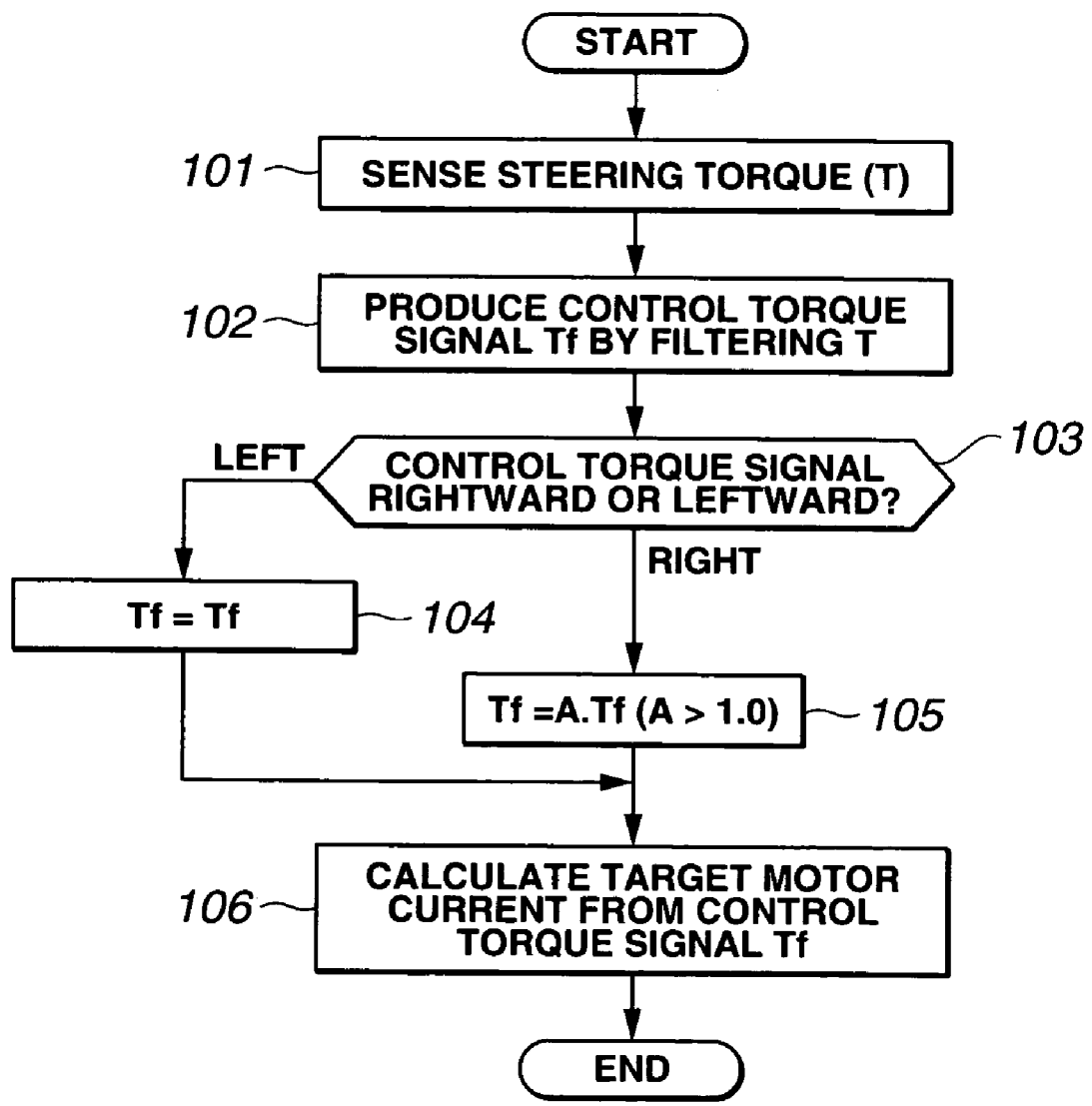
FIG. 10 is a flowchart showing a drive signal modifying process in a first practical example according to the seventh embodiment.

FIG. 10 shows a first practical example according to the seventh embodiment. Control unit 10 calculates the target motor current in accordance with a torque signal T supplied from torque sensor 11. In the first practical example, control unit 10 is configured to modify the torque signal T.

FIG. 10 shows a drive signal correcting process in the form of a flowchart. In the example shown in FIG. 10, the pressure loss is greater on the right side, and smaller on the left side. At step 101, control unit 10 senses a steering torque by receiving a torque signal T from torque sensor 11. At step 102, control unit 10 performs a filtering operation on the torque signal T and thereby produces a control torque signal Tf. At step 103, control unit 10 checks the steering direction of control torque signal Tf. Control unit 10 proceeds from step 103 to step 105 in the case of rightward steering direction (to supply the hydraulic pressure to first pressure chamber 41); and to step 104 in the case of leftward steering direction (to supply the hydraulic pressure to second pressure chamber 42). At step 104, control unit 10 outputs the control torque signal Tf without modification. At step 105, control unit 10 outputs the value obtained by multiplying the control torque signal Tf by a correction coefficient A (A>1.0). At step 106 reached from step 104 or 105, control unit 10 calculates the target motor current (the motor drive signal) from the control torque signal Tf determined at step 104 or 105, and thereby performs the power assist control. In this way, the power steering system of this practical example can improve the steering feeling by modifying the control torque signal Tf.

Figure 11:
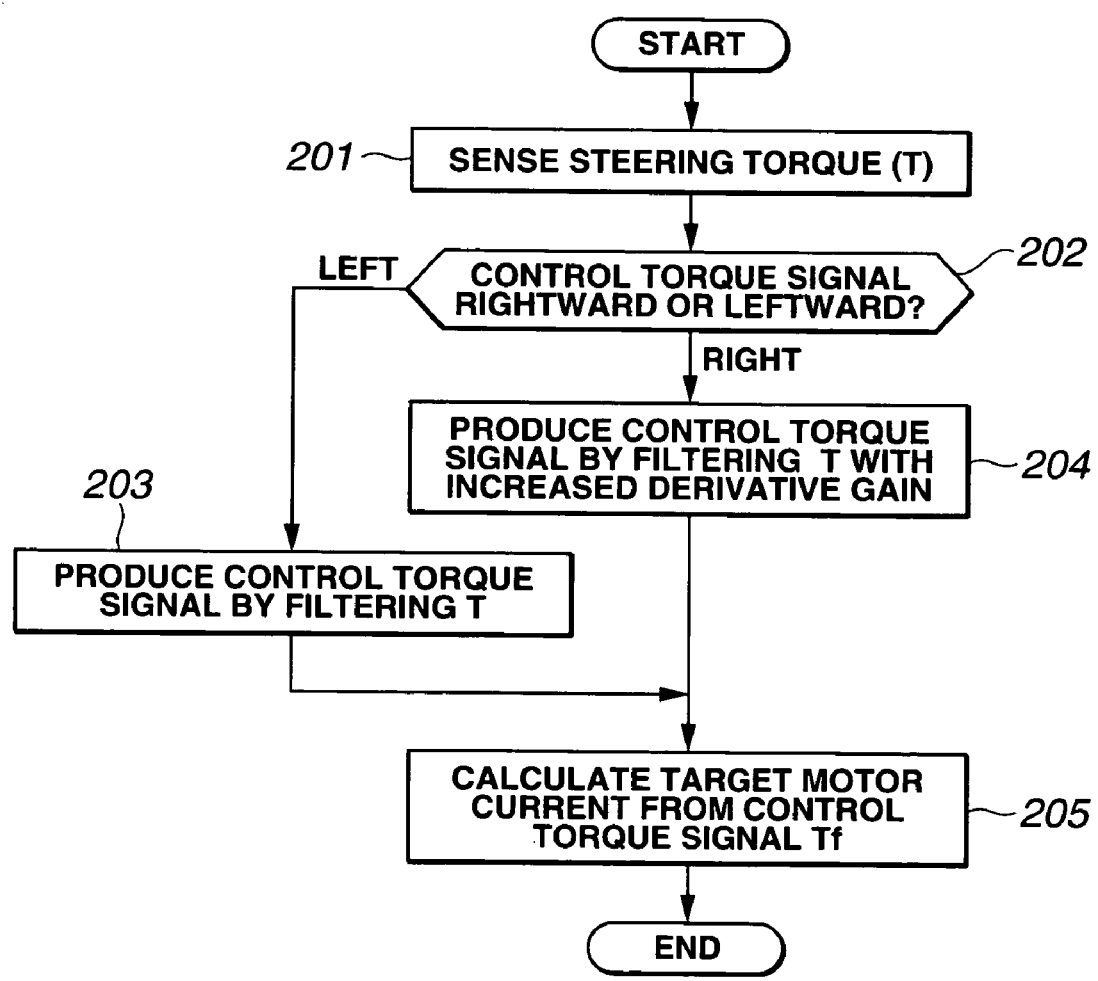
FIG. 11 is a flowchart showing a drive signal modifying process in a second practical example according to the seventh embodiment.

FIG. 11 shows a second practical example according to the seventh embodiment. In the example shown in FIG. 11, the pressure loss is greater on the right side, and smaller on the left side. In controlling motor 8, control unit 10 produces the motor drive signal according to the PID control action based on the deviation between the target motor current and the actual motor current. When the oil pressure is supplied to second pressure chamber 92 through second fluid passage 92 having a greater pressure loss, control unit 10 uses a correction term for correcting a delay of the pressure. In this example, control unit 10 of this example is configured to modify a derivative term by modifying a derivative gain to compensate for the delay.

FIG. 11 shows a drive signal modifying process in the form of a flowchart. At step 201, control unit 10 senses a steering torque by receiving the torque signal T from torque sensor 11. At step 202, control unit 10 checks the steering direction of the torque signal. Control unit 10 proceeds from step 202 to step 204 in the case of rightward steering direction (to supply the hydraulic pressure to first pressure chamber 41); and to step 203 in the case of leftward steering direction (to supply the hydraulic pressure to second pressure chamber 42). At step 203, control unit 10 performs a filtering operation on the torque signal T and thereby produces the control torque signal Tf. At step 204, control unit 10 produces the control torque signal Tf by performing the filtering operation on the torque signal T and increasing the derivative gain of the derivative term. At step 205 reached from step 203 or 204, control unit 10 calculates the target motor current (the motor drive signal) from the control torque signal Tf determined at step 203 or 204, and thereby performs the power assist control.

In this way, the power steering system of this practical example can improve the steering feeling by increasing the derivative term on the side on which the pressure loss is greater, and thereby preventing a response delay. Thus, control unit 10 is configured to modify the motor drive signal so as to increase the pump discharge pressure on the side on which the pressure loss is greater. Since the first fluid passage is shorter, and smaller in pressure loss, the control unit 10 outputs the motor drive signal without modification. On the other hand, since the second fluid passage 92 is longer and hence greater in pressure loss, the control unit 10 modifies the motor drive signal to a greater value. In this way, the power steering system of this example can equalize the steering torque between the leftward and rightward steering operations, and improve the steering feeling.

Figure 12:
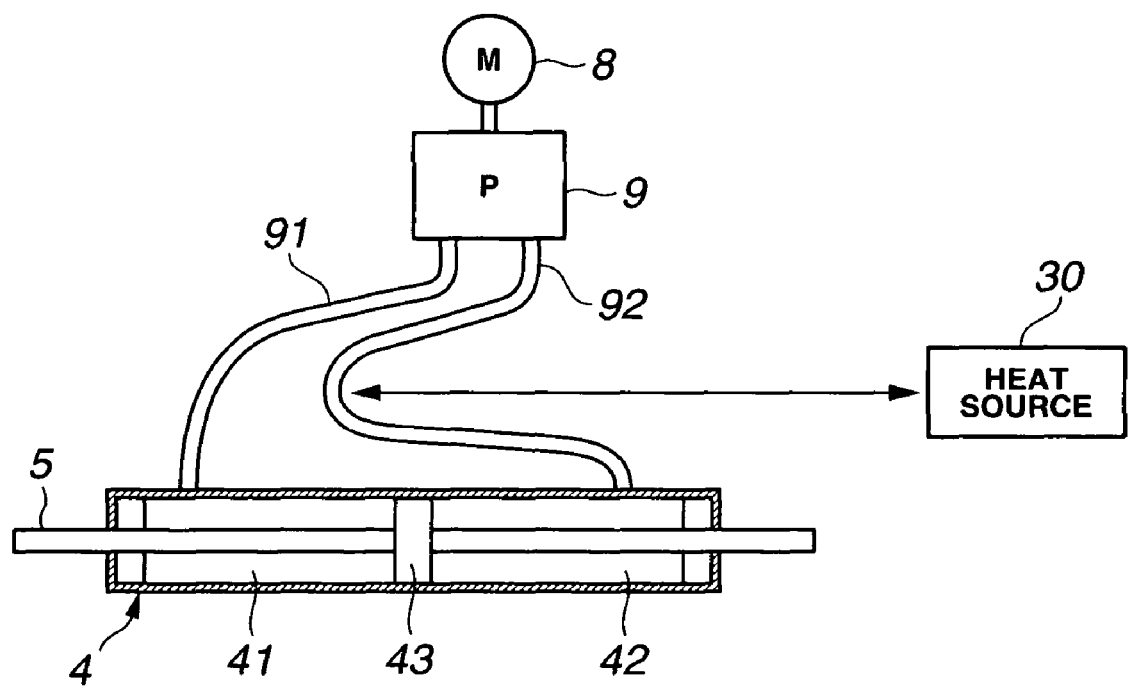
FIG. 12 is a schematic view showing a main part of power steering apparatus according to an eighth embodiment.

FIG. 12 shows a main part of a power steering system according to an eighth embodiment. This system is basically the same as the power steering system of the first embodiment, and the following explanation is directed mainly to different points to avoid repetitive explanation. In this embodiment, the first and second fluid passages 91 and 92 are placed as far as possible from a heat source 30, so that no influence is exerted on first and second fluid passages 91 and 92 from heat source 30.

The pressure loss of a hydraulic oil includes a kinematic viscosity of the oil as a parameter, and the kinematic viscosity is varied largely in dependence on the temperature. Therefore, if influence is exerted from heat source 30 only on one of the first and second fluid passages 91 and 92, the kinematic viscosity of the oil becomes lower only in the thermally affected passage, and the oil tends to become unable to produce a sufficient pressure because of an increase of leakage and other factors. In general, the power steering system is installed in an engine compartment of a motor vehicle, together with various heat sources such as an engine, and an exhaust pipe. Therefore, in this embodiment, the first and second fluid passages 91 and 92 on the left and right sides are so arranged as to increase the distance between first fluid passage 91 and heat source 30, and to increase the distance between second fluid passage 92 and heat source 30, and to equalize the temperature environments or thermal environments of first and second fluid passages 91 and 92 on the right and left sides to equalize the pressure losses in the first and second fluid passages 91 and 92. In this example, the first and second fluid passages 91 and 92 are asymmetric with respect to an imaginary median plane bisecting the power cylinder 4, as shown in FIG. 12.

In this way, the first and second fluid passages 91 and 92 are made substantially equal in the temperature condition and in the oil temperature. Therefore, the power steering system can improve the steering feeling by equalizing the pressure loss between first and second fluid passages.

Figure 13:
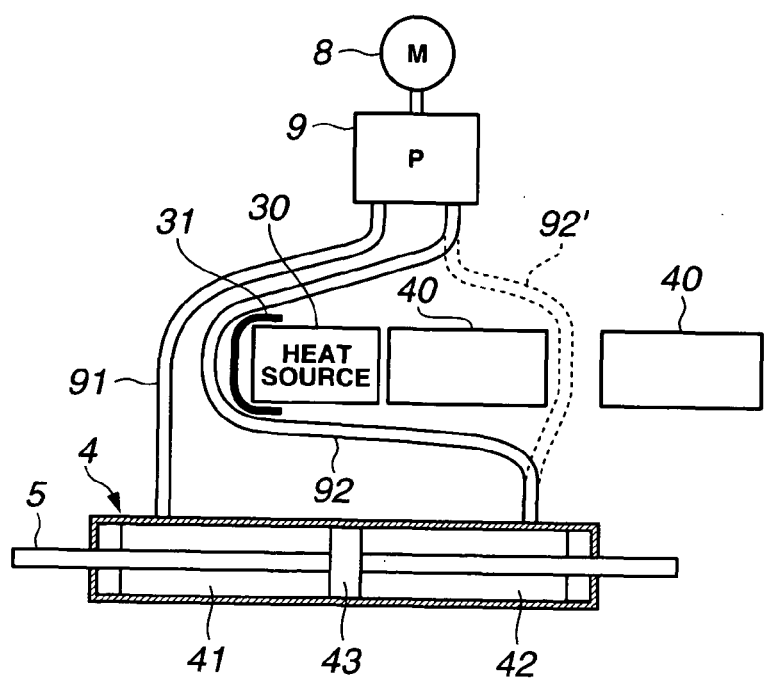
FIG. 13 is a schematic view showing a main part of power steering apparatus according to a ninth embodiment.

FIG. 13 shows a main part of a power steering system according to a ninth embodiment. This system is basically the same as the power steering system of the first embodiment, and the following explanation is directed mainly to different points to avoid repetitive explanation. In this embodiment, first and second fluid passages 91 and 92 are both placed closer to a heat source 30 so that both passages receives influence of heat source 30 to substantially equal degrees. In the example of FIG. 13, there is further provided a shield plate 31 between the heat source 30 and the first and second fluid passages 91 and 92 to prevent excessive heat transmission.

In the example of FIG. 13, one of the first and second fluid passages 91 and 92 can be placed between two obstructions 40 as shown at 92', but both passages 91 and 92 cannot be placed between the obstructions 40. Therefore, both of first and second fluid passages 91 and 92 are placed on the same side of heat source 30 and the temperature conditions are made substantially equal between both passages to equalize the pressure loss. In this example, the shield plate 31 is interposed though shield plate 31 is not essential.

Figure 14:
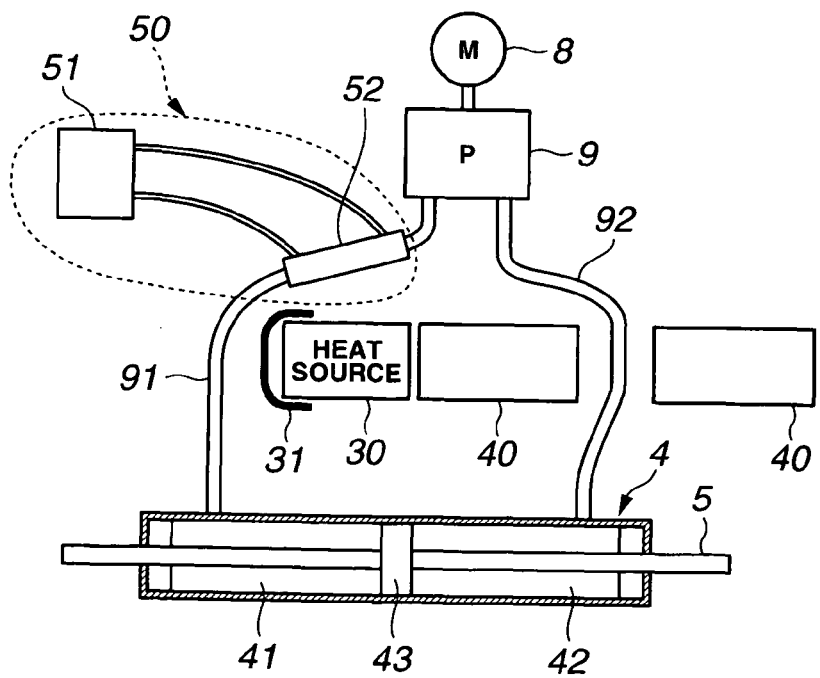
FIG. 14 is a schematic view showing a main part of power steering apparatus according to a tenth embodiment.

FIG. 14 shows a main part of a power steering system according to a tenth embodiment. This system is basically the same as the power steering system of the first embodiment, and the following explanation is directed mainly to different points to avoid repetitive explanation. In the example shown in FIG. 14, first fluid passage 91 is placed near a heat source 30, and second fluid passage 92 is placed between obstructions 40. Moreover, there is provided a cooling device 50 of a liquid cooling type serving as oil cooling means. The cooling device 50 includes a radiator 51 and a heat exchanger 52, and is arranged to cool the fluid in first fluid passage 91. A shield plate 31 is interposed between heat source 30 and first fluid passage 91.

By contrast to the arrangement shown in FIG. 13, the second fluid passage 92 in the example of FIG. 14 extends between the obstructions 40, and only the first fluid passage 91 is placed near heat source 30. However, the cooling device 50 acts to equalize the oil temperatures of first and second fluid passages by cooling the oil in first fluid passage 91 in the warmer surroundings. It is possible to achieve a shortest piping layout. Though not essential, the shield plate 31 prevents excessive heat transmission from heat source 30 to first fluid passage 91. Cooling device 50 can serve as a main component of the correcting section.

Figure 15:
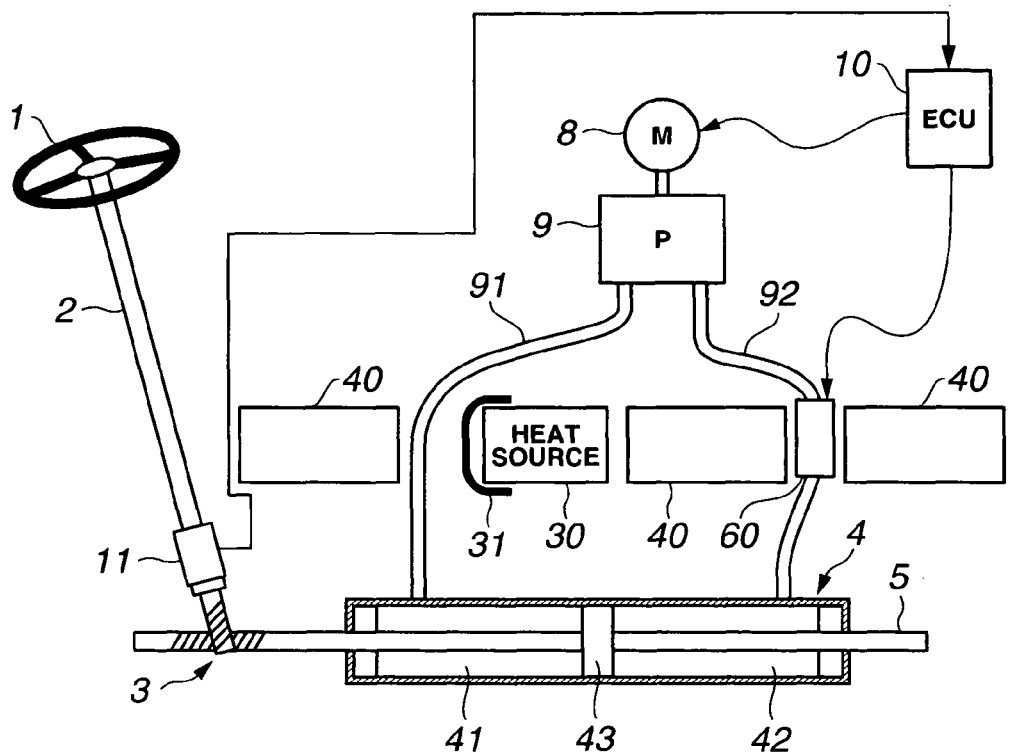
FIG. 15 is a schematic view showing a main part of power steering apparatus according to an eleventh embodiment.

FIG. 15 shows a main part of a power steering system according to an eleventh embodiment. This system is basically the same as the power steering system of the first embodiment, and the following explanation is directed mainly to different points to avoid repetitive explanation. In the example shown in FIG. 15, like the example of FIG. 14, the first fluid passage 91 is placed near a heat source 30 and the second fluid passage 91 is placed between two obstructions 40. In the example of FIG. 15, unlike FIG. 14, there is provided a heating device or heater 60 serving as oil heating means for increasing the oil temperature of the second fluid passage 92 in the cooler surroundings. The heating device 60 is controlled by control unit 10. A shield plate 31 is interposed between heat source 30 and first fluid passage 91.

Heating device 60 can equalize the oil temperatures and kinetic viscosities of the oil in the first and second fluid passages 91 and 92, and improve the steering feeling. The cooling device 50 of FIG. 14 composed of two units 51 and 52 is often difficult to install in a narrow space among various component parts in the form of obstruction 40 in the engine compartment of a vehicle. In such a case, the heating device can be compactly disposed around the second fluid passage 92 in the cooler surroundings. The heating device 60 can serve as a main component of the correction section, and make it possible to attain the shortest piping arrangement. A shield plate 31 is interposed between heat source 30 and first fluid passage 91. Control unit 10 can control the heating device 60 in various manners. For example, control unit 10 estimates a temperature condition of first fluid passage 91 from an engine operating parameter such as the engine speed, and controls the heating device 60 in accordance with the estimated temperature condition. Alternatively, control unit 10 receives a signal from a temperature sensor provided for sensing the temperature of first fluid passage 91, and the control unit 10 controls the temperature of second fluid passage 92 with the heating device 60 according to a PID control law by using the temperature sensed by the temperature sensor as a target value.

Figure 16:
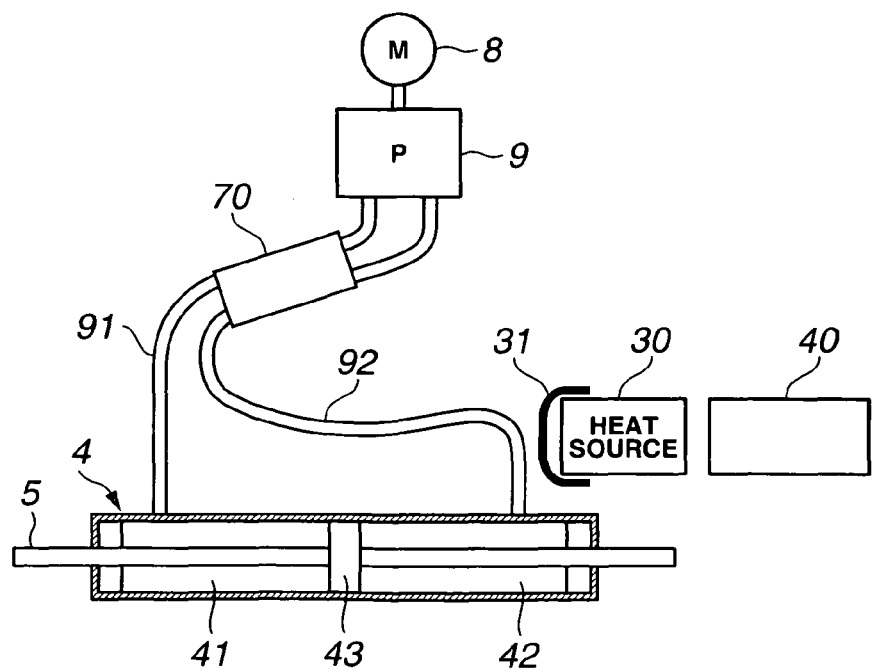
FIG. 16 is a schematic view showing a main part of power steering apparatus according to a twelfth embodiment.

FIG. 16 shows a main part of a power steering system according to a twelfth embodiment. This system is basically the same as the power steering system of the first embodiment, and the following explanation is directed mainly to different points to avoid repetitive explanation. In the example shown in FIG. 16, second fluid passage 92 has a portion placed near a heat source 30, and there is provided, between first and second fluid passages 91 and 92, a heat exchanger 70 serving as means for transmitting heat between first and second fluid passages 91 and 92. In this example, a shield plate 31 is placed between the heat source 30 and second fluid passage 92 to prevent excessive heat transmission to second fluid passage 92 from heat source 30.

Heat exchanger 70 can equalize the temperature conditions of the oil in the first and second fluid passages 91 an 92 even if the first and second fluid passages 91 and 92 are exposed to unequal thermal atmospheres. Heat exchanger 70 can serve as a component of the correction section. Instead of heat exchanger 70 (or in addition to heat exchanger 70), it is possible to provide, as the heat transmitting means, a heat conductive member having a high heat conductivity connecting the first and second fluid passages 91 and 92 to conduct heat between the passages.

In the example shown in FIG. 16, the heat exchanger 70 is disposed near the reversible pump 9; the number of bends of second fluid passage 92 is greater than that of first fluid passage 91; and heat source 30 is placed near a downstream portion of second fluid passage 92 near power cylinder 4. As mentioned before, the pressure loss is increased when the pipe length is longer, and the number of bends is greater. Therefore, in this example, the heat exchanger 70 as the heat transmitting device is disposed at a position closer to reversible pump 9 and relatively far from heat source 30. At a position near power cylinder 4, the temperature is set relatively high. In this way, this embodiment can increase the freedom of layout and makes the pressure losses of first and second fluid passages 91 and 92 substantially equal to each other.

Figure 17:
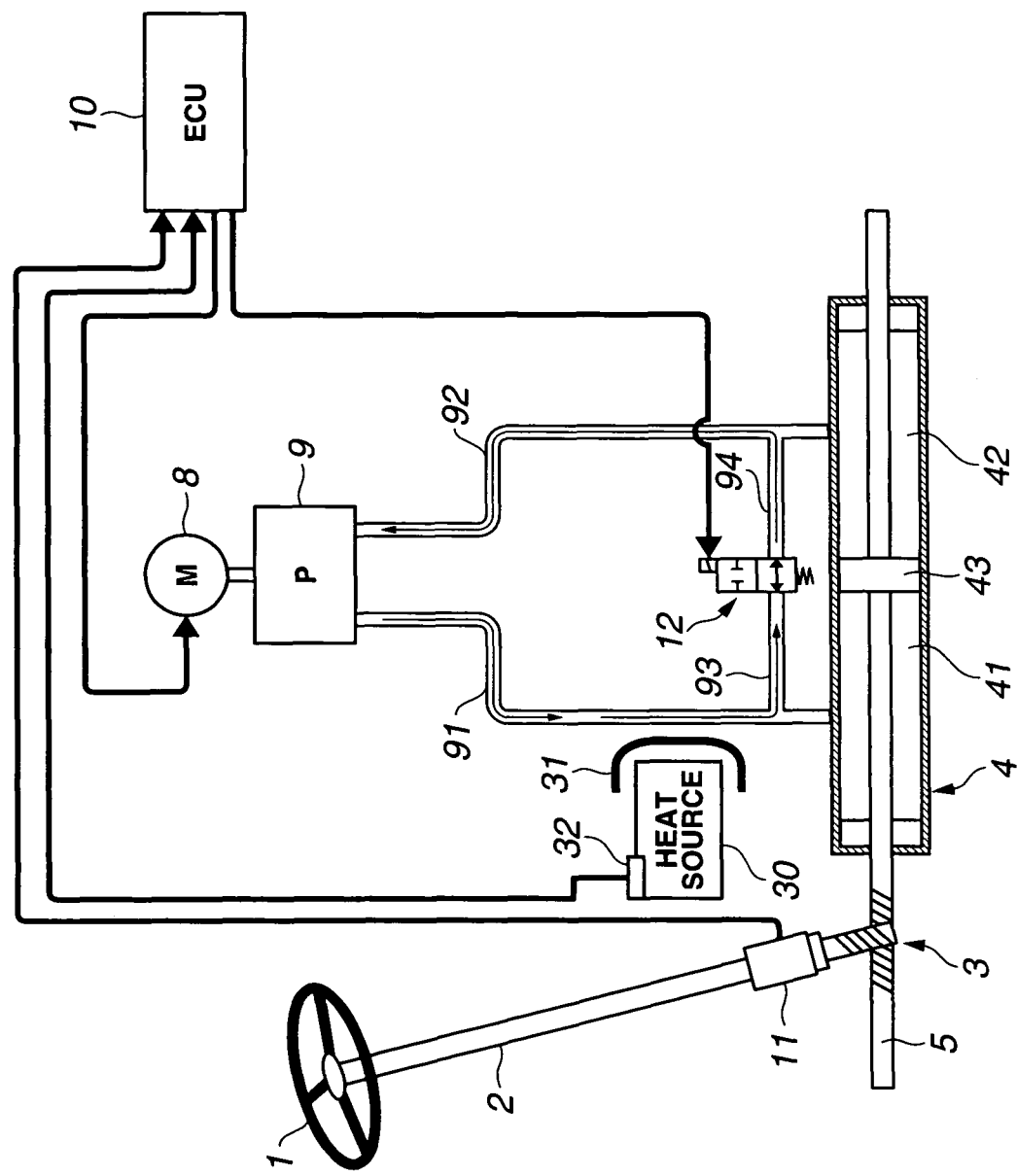
FIG. 17 is a schematic view showing a main part of power steering apparatus according to a thirteenth embodiment.

FIG. 17 shows a power steering system according to a thirteenth embodiment. This system is basically the same as the power steering system of the first embodiment, and the following explanation is directed mainly to different points to avoid repetitive explanation. In the example of FIG. 17, though the first and second fluid passages 91 and 92 are equal in the passage length and the number of bends, the first fluid passage 91 is placed near a heat source 30. A shield plate 31 is placed between heat source 30 and first fluid passage 91. In heat source 30, there is provided a temperature sensor 32 which senses the temperature of heat source 30 and sends a temperature signal to control unit 10.

Control unit 10 is configured to circulate the oil between first and second fluid passages 91 and 92 to equalize the temperature conditions of first and second fluid passages 91 and 92, by opening the fail-safe valve 12 and driving reversible pump 9 when the temperature of heat source become high, and the temperature difference between first and second fluid passages 91 and 92 becomes greater. The fail-safe valve 12 can serve as one component of the correcting section. Thus, the power steering system of this embodiment can equalize the temperature conditions between first and second fluid passages 91 and 92 by circulating the fluid, and prevent the oil temperature from becoming high only on one side.

Figure 18:
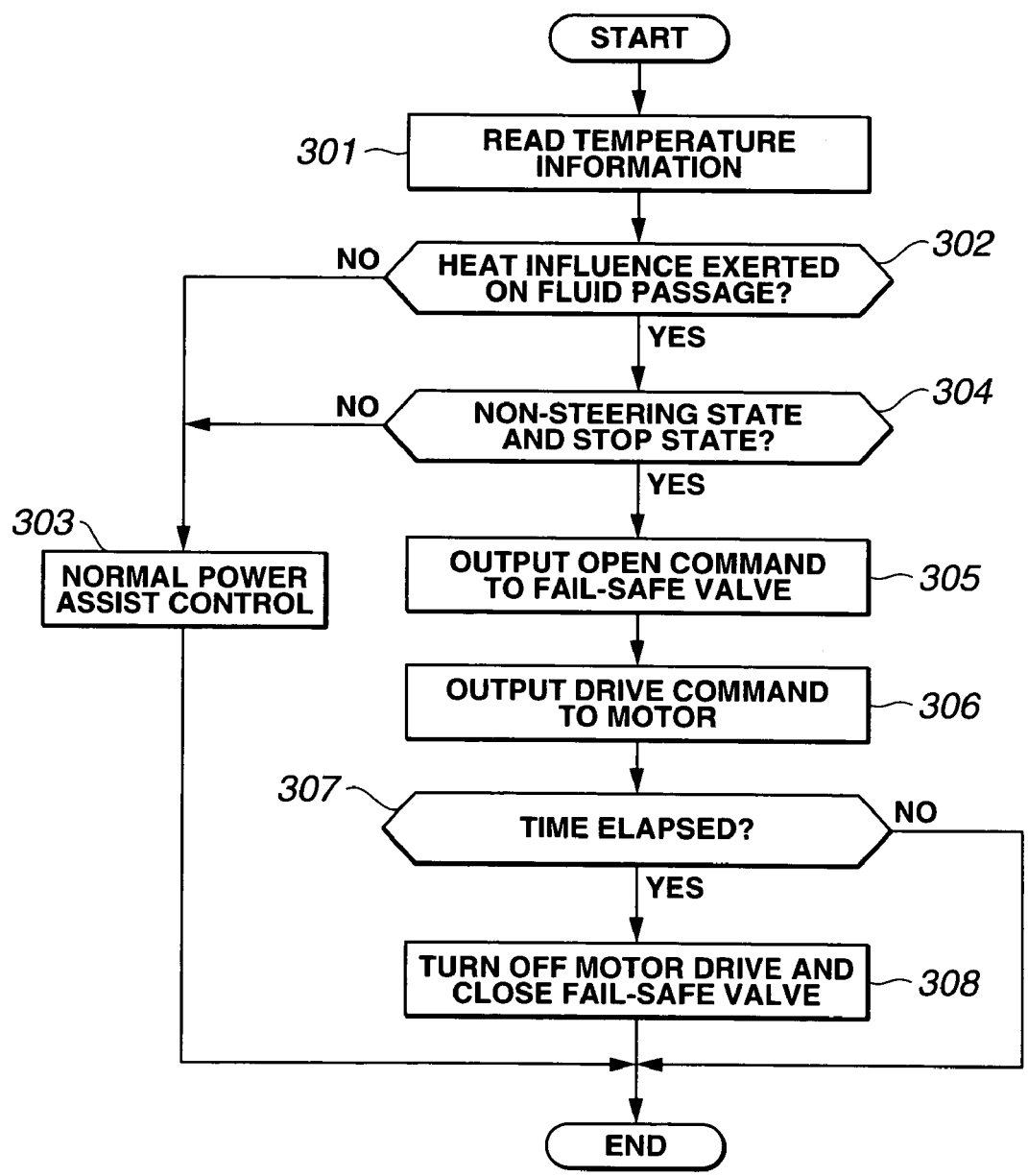
FIG. 18 is a flowchart showing an oil circulation control process performed by the system of FIG. 17.

FIG. 18 shows a fluid circulation control process performed by control unit 10 shown in FIG. 17. At step 301, control unit 10 reads information on the temperature supplied from temperature sensor 32. At step 302, control unit 10 examiners whether the actual temperature sensed by temperature sensor 32 is higher than or equal to a predetermined temperature affecting thermal influence on first fluid passage 91. When the actual temperature is higher than or equal to the predetermined temperature, control unit 10 proceeds to step 304 on the assumption that the first fluid passage 91 is thermally affected by heat source 30. When the sensed actual temperature is lower than the predetermined temperature, control unit 10 proceeds to step 303. At step 303, control unit 10 performs a power assist control in a normal mode.

At step 304, control unit 10 examines whether the absolute value of the steering torque is smaller than or equal to a predetermined torque value representing a non-steering state, and at the same time the vehicle is in a stop state. When a steering operation is in progress or the vehicle is moving, then the control unit 10 proceeds to step 303 and performs the normal power assist control. When, on the other hand, the absolute value of the steering torque is low and the vehicle is held at the stop state, control unit 10 produces a command signal to open the fail-safe valve 12 and thereby opens the valve 12 at step 305. Then, at step 306, control unit 10 produces a drive signal to motor 8 and thereby drives motor 8. At a next step 307, control unit 10 checks whether a predetermined time interval has elapsed from the start of the motor driving operation at step 306. At the expiration of the predetermined time interval, control unit 10 proceeds to step 308. Otherwise, control unit 10 terminates the process of FIG. 18, and repeats a next control cycle by continuing the motor drive operation. At step 308, control unit 10 stops the motor drive and closes the fail-safe valve 12 to terminate the agitation of the oil, and then terminate the control process of FIG. 18.

When the vehicle is not moving, and the steering wheel is not operated, then the power steering system can stop the power assistance without decreasing the safety. Therefore, when the vehicle is held at rest, and the steering mechanism is out of operation, then the control unit 10 opens the fail-safe valve 12, thereby to form a circulating passage with the first and second branch passages 93 and 94 between first and second fluid passages 91 and 92; and drives motor 8 to force the oil to flow through the circulating passage between first and second fluid passages 91 and 92. Thus, the power steering system can equalize the oil temperatures in the first and second fluid passages 91 and 92. The fail-safe valve 12 is connected near power cylinder 4 in order to secure the feasibility of manual steering in case of failure. Therefore, the system can circulate most of the oil in the first and second fluid passages 91 and 92. In the thirteen embodiment, too, it is possible to employ the asymmetric arrangement in which first and second fluid passages 91 and 92 are asymmetric with respect to the imaginary median plane bisecting the power cylinder into left and right equal halves.

Figure 19:
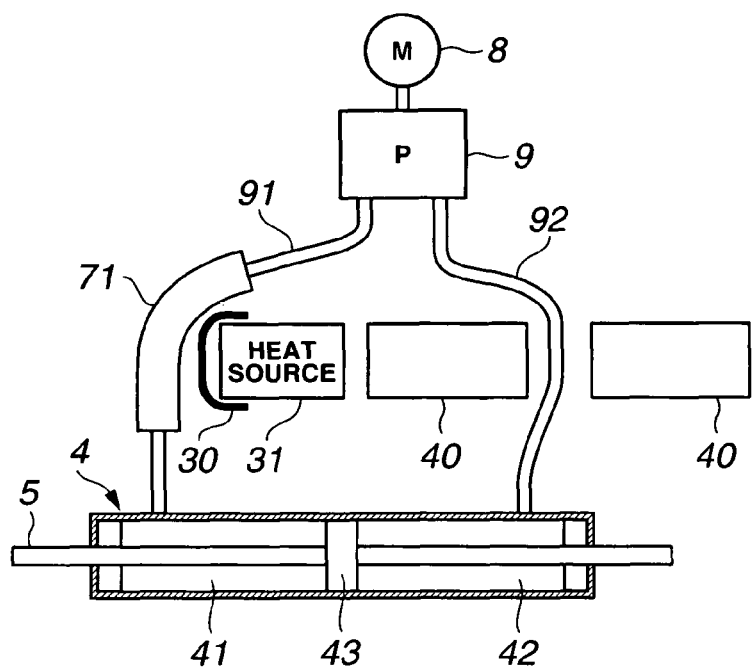
FIG. 19 is a schematic view showing a main part of power steering apparatus according to a fourteenth embodiment.

FIG. 19 shows a main part of a power steering system according to a fourteenth embodiment. This system is basically the same as the power steering system of the first embodiment, and the following explanation is directed mainly to different points to avoid repetitive explanation. In the example of FIG. 19, first fluid passage 91 is placed near a heat source 30, and second fluid passage 92 is placed between two obstructions 40. In this embodiment, first fluid passage 91 in the warmer or hotter environment is provided with a heat insulating member 71 (serving as a component of the correcting section). A shield plate 31 is placed between heat source 30 and first fluid passage 91. In this example, first fluid passage 91 is enclosed by the heat insulator 71 having a tubular shape.

Thus, in this embodiment, the heat insulating member 71 of heat insulator is provided for first fluid passage 91 disposed in the warmer or hotter surroundings.

Figure 20:
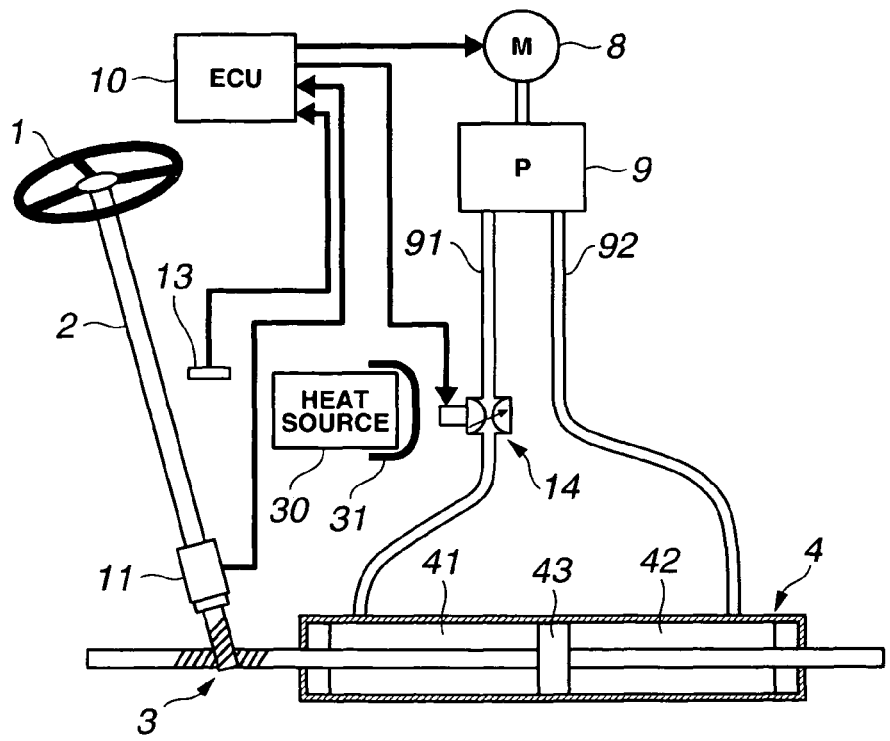
FIG. 20 is a schematic view showing a main part of power steering apparatus according to a fifteenth embodiment.

FIG. 20 shows a main part of a power steering system according to a fifteenth embodiment. This system is basically the same as the power steering system of the first embodiment, and the following explanation is directed mainly to different points to avoid repetitive explanation. In the example of FIG. 20, first fluid passage 91 is placed near a heat source 30, and provided with a variable flow restriction 14 capable of varying the opening size of the flow passage under the control of control unit 10. A water temperature sensor 13 is arranged to sense the temperature of the cooling water of the engine. Water temperature sensor 13 serves as means for sensing or estimating the oil temperature of reversible pump 9 or the temperature of a nearby heat source. In this example, the first and second fluid passages 91 and 92 are designed so that the pressure losses of the passages 91 and 92 are substantially equal to each other when the influence from heat source 30 is weak. A shield plate is 31 is placed between heat source 30 and first fluid passage 91. The variable flow restriction (actuator) 14 can be controlled in various manners. The following are three examples.

In a first practical example according to the fifteenth embodiment, the opening degree or throttle degree of the variable flow restriction 14 is controlled in accordance with the engine coolant temperature which, in this example, is sensed by water temperature sensor 13. The heat of the nearby heat source 30 becomes influential on first fluid passage 91 only after the engine is warmed up. Therefore, control unit 10 controls the variable flow restriction 14 in accordance with the engine temperature represented by the engine coolant temperature.

Figure 21:
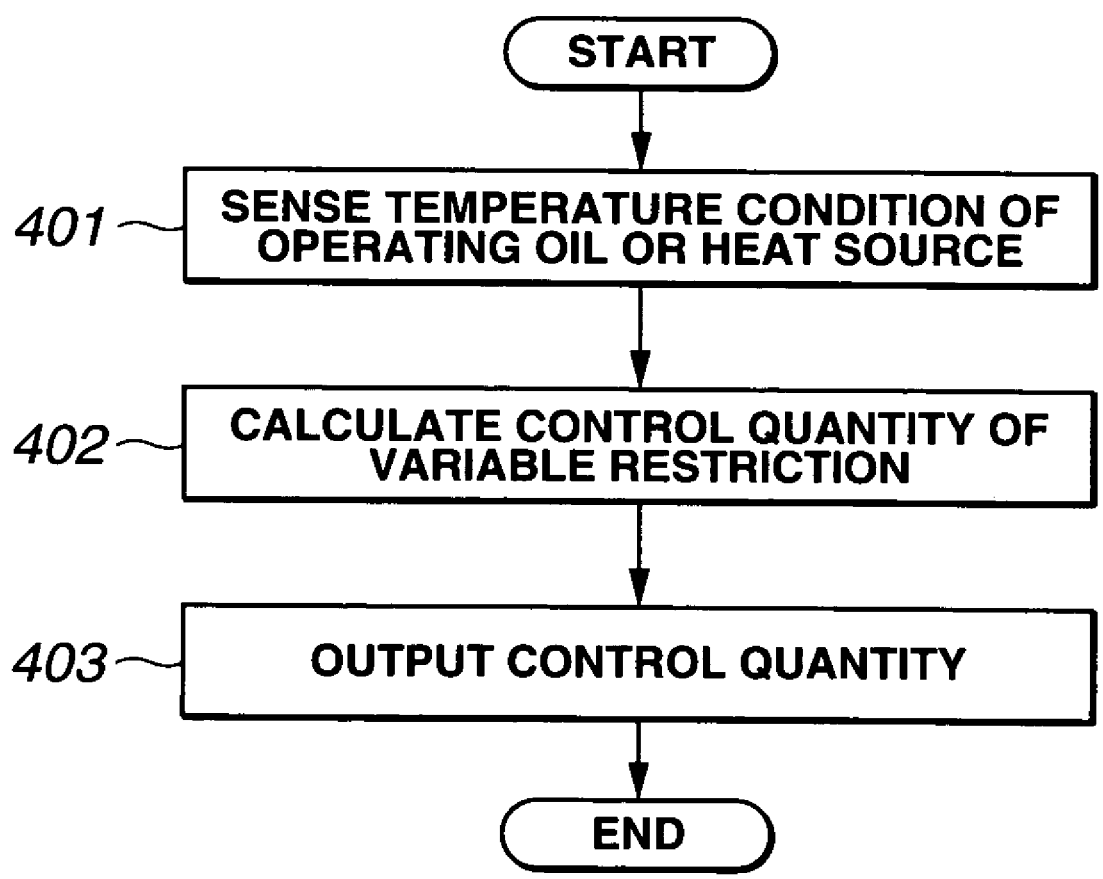
FIG. 21 is a flowchart showing a flow restriction control process in a first practical example according to the fifteenth embodiment.

FIG. 21 is a flowchart showing a variable flow restriction control process performed by control unit 10. At step 401, control unit 10 reads the engine coolant temperature or engine cooling water temperature (or the operating oil temperature or the temperature of the nearby heat source). At step 402, control unit 10 calculates a control quantity of the variable flow restriction 14 in accordance with the temperature. At step 403, control unit 10 controls the opening degree of the variable flow restriction 14 by sending a control signal representing the control quantity to variable flow restriction 14. Control unit 10 increases the throttle degree to increase the pressure loss when the engine coolant temperature becomes higher, and decreases the throttle degree to decrease the pressure loss when the engine coolant temperature is lower.

Figure 22:
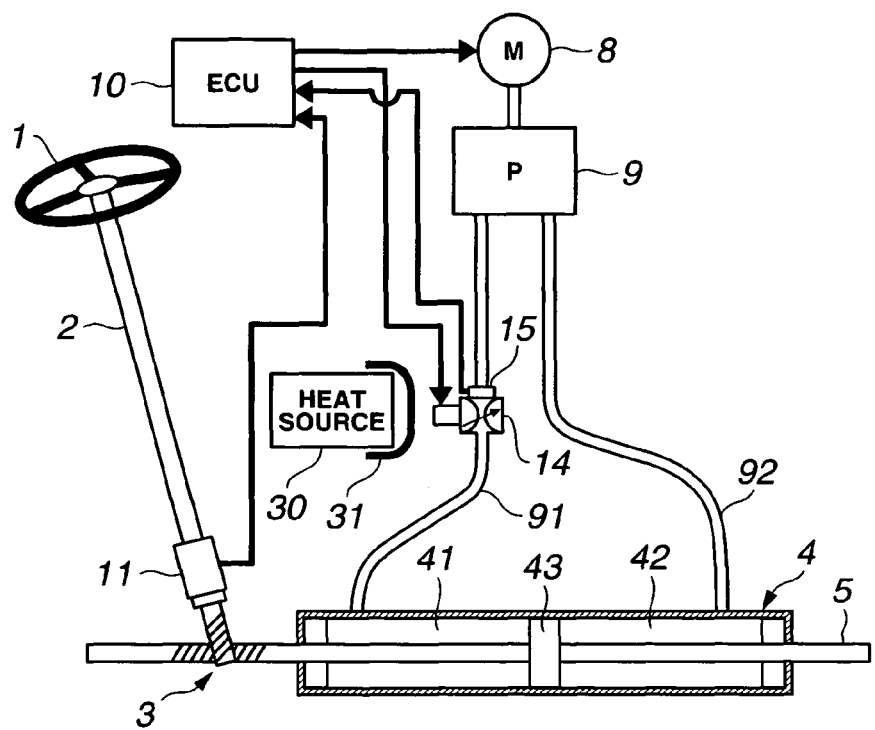
FIG. 22 is a schematic view showing a main part of power steering apparatus in a second practical example according to the fifteenth embodiment.

FIG. 22 shows a main portion of a power steering system in a second practical example according to the fifteenth embodiment. By the influence from the heat source 30 located near the first fluid passage 91, the operating oil near the heat source 30 is warmed. Therefore, by monitoring the oil temperature sensed by an oil temperature sensor 15, the control unit 10 controls the throttle degree of variable flow restriction 14. Control unit 10 increases the throttle degree to increase the pressure loss when the oil temperature becomes higher, and decreases the throttle degree to decrease the pressure loss when the oil temperature is lower. Oil temperature sensor 15 of this example is provided at variable flow restriction 14 in first fluid passage 91.

Figure 23:
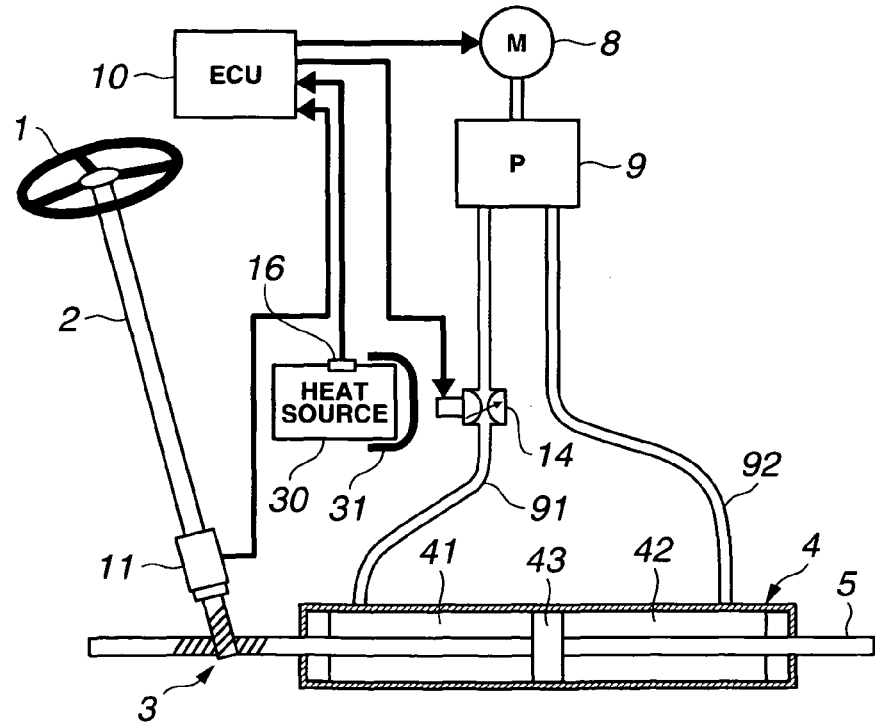
FIG. 23 is a schematic view showing a main part of power steering apparatus in a third practical example according to the fifteenth embodiment.

FIG. 23 shows a main part of a power steering system in a third practical example according to the fifteenth embodiment. The heat of the nearby heat source 30 becomes influential on first fluid passage 91 only after the engine is warmed up. The engine temperature is related with the engine exhaust gas temperature, and the engine exhaust gas temperature is related with the combustion efficiency. Therefore, in the third practical example, the control unit 10 monitors an oxygen quantity sensed by an oxygen sensor or $O_2$ sensor 16 used for controlling the air-fuel mixture ratio by controlling the fuel injection quantity of the engine, for example; and controls the throttle degree of variable flow restriction 14 in accordance with the oxygen quantity.

Control unit 10 increases the throttle degree to increase the pressure loss when the oxygen quantity is smaller and hence the combustion temperature is assumed to be lower. Control unit 10 decreases the throttle degree to decrease the pressure loss when the oxygen quantity is greater and the combustion temperature is assumed to be higher.

It is possible to employ various other sensors instead of the sensors employed in these practical examples. For example, as a parameter in accordance with which the variable flow restriction 14 is controlled, it is possible to employ at least one of the temperature of an engine oil, the temperature of an oil in an automatic transmission, the sensed or estimated temperature of a motor as a prime mover in a hybrid vehicle, and the temperature of a coolant or cooling water for cooling an inverter.

Thus, in the power steering system according to the fifteenth embodiment, the first and second fluid passages 91 and 92 are arranged so that the pressure loss is greater in the passage (91) having a portion located in hotter surroundings tending to cause the oil temperature to become higher. The variable flow restriction or orifice is disposed in the passage (91) in the hotter surroundings, and arranged to decrease the opening area of the passage as the oil temperature in the passage becomes higher. The opening degree of the variable flow restriction can be controlled in accordance with the temperature sensed by at least one of the exhaust gas temperature sensor, the engine coolant temperature sensor and the oil temperature sensor. The control unit 10 is configured to vary the pressure loss of at least one of first and second fluid passages 91 and 92 in accordance with the temperature condition affecting the thermal atmospheres of first and second fluid passages 91 and 92, such as the oil temperature or the temperature of the atmosphere. Thus, the power steering system can make the pressure losses of the passages on both sides substantially equal to each other and thereby improve the steering feeling.

This application is based on a prior Japanese Patent Application No. 2005-113337 filed on Apr. 11, 2005. The entire contents of this Japanese Patent Application No. 2005-113337 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering apparatus comprising:
    a hydraulic power cylinder including first and second fluid pressure chambers configured to assist a steering mechanism;
    a reversible pump including first and second outlets configured to supply a hydraulic pressure to the power cylinder;
    a first fluid passage connecting the first outlet of the reversible pump with the first pressure chamber of the power cylinder;
    a second fluid passage connecting the second outlet of the reversible pump with the second pressure chamber of the power cylinder;
    a motor configured to drive the reversible pump in one of forward and reverse directions;
    a steering load sensing section configured to ascertain a steering load of the steering mechanism; and
    a motor controlling section configured to control the motor in accordance with the steering load;
    wherein the first and second fluid passages are asymmetric such that the first and second fluid passages are unequal in pressure loss; and
    wherein the power steering apparatus further comprises a correcting section configured to make pressure losses of the first and second fluid passages substantially equal to each other;
    wherein each of the first and second fluid passages comprises a flexible tube.

2. The power steering apparatus as claimed in claim 1, wherein the apparatus is configured such that a difference between the pressure loss of the first fluid passage and the pressure loss of the second fluid passage is smaller than or equal to 0.5 N·m in terms of a steering torque.

3. The power steering apparatus as claimed in claim 1, wherein the motor controlling section is configured to produce a motor drive signal to drive the motor in accordance with the steering load; and the correction section is configured to modify the motor drive signal to increase a pump discharge pressure for one of the first and second fluid passages which is greater in pressure loss than the other passage.

4. The power steering apparatus as claimed in claim 1, wherein the first and second fluid passages are substantially equal in length.

5. The power steering apparatus as claimed in claim 1, wherein the number of bends in the first fluid passage is equal to the number of bends in the second fluid passage.

6. The power steering apparatus as claimed in claim 1, wherein the first and second fluid passages are equal in material.

7. The power steering apparatus as claimed in claim 1, wherein the first and second fluid passages are asymmetric with respect to an imaginary median plane bisecting the power cylinder into left and right equal halves.

8. The apparatus as claimed in claim 1, wherein the unequal condition of the first and second fluid passages includes at least one of length, inside cross sectional size, shape, material, and temperature.

* * * * *